United States Patent [19]
Stolte

[11] Patent Number: 5,241,448
[45] Date of Patent: Aug. 31, 1993

[54] DEMAGNETIZING CIRCUIT FOR A COLOR PICTURE TUBE

[75] Inventor: Johannes Stolte, VS-Tannheim, Netherlands

[73] Assignee: Deutsche Thomson-Brandt GmbH, Villingen, Fed. Rep. of Germany

[21] Appl. No.: 790,893

[22] Filed: Nov. 12, 1991

[30] Foreign Application Priority Data

Dec. 22, 1990 [DE] Fed. Rep. of Germany ....... 4041484

[51] Int. Cl.$^5$ .................... H01F 13/00; H01H 47/00; H04N 9/29
[52] U.S. Cl. ........................ 361/150; 315/8; 361/165
[58] Field of Search ............ 315/8, 85; 361/150, 361/154, 267, 151, 155, 165; 335/284; 307/101

[56] References Cited

U.S. PATENT DOCUMENTS

| | | | |
|---|---|---|---|
| 2,962,622 | 11/1960 | Popovich | 315/8 |
| 3,322,998 | 5/1967 | Norley | 315/8 |
| 3,387,172 | 6/1968 | Simon | 315/8 |
| 3,486,080 | 12/1969 | Tillmann | 315/8 X |
| 4,441,052 | 4/1984 | Willis | 315/8 |
| 4,742,270 | 5/1986 | Fernsler et al. | 315/8 |
| 4,760,489 | 7/1988 | Truskalo | 361/150 |
| 4,769,577 | 9/1988 | Morrish | 315/8 |

FOREIGN PATENT DOCUMENTS

| | | |
|---|---|---|
| 2035519 | 1/1972 | Fed. Rep. of Germany . |
| 3343031 | 11/1982 | Fed. Rep. of Germany . |
| 3633069 | 9/1985 | Fed. Rep. of Germany . |
| 810782 | 3/1959 | United Kingdom ............. 361/165 |

OTHER PUBLICATIONS

Blaha, Robert F., "IEEE Transactions on Broadcast and Television Receivers", vol. BTR-18, No. 1, Feb. 1972, pp. 7-9.

Primary Examiner—A. D. Pellinen
Assistant Examiner—Fritz M. Fleming
Attorney, Agent, or Firm—Joseph S. Tripoli; Joseph J. Laks; Francis A. Davenport

[57] ABSTRACT

A demagnetizing circuit for a color picture tube includes a parallel combination of a relay coil and a negative temperature coefficient (NTC) resistor in series with the primary of the power supply transformer. The contact of the relay is connected into the degaussing circuit. As the NTC warms up the current through it increases and the current through the relay coil correspondingly decreases. When the current through the relay coil falls below the relay holding current the relay contact opens and the demagnetizing current ceases to flow.

3 Claims, 1 Drawing Sheet

DEMAGNETIZING CIRCUIT FOR A COLOR PICTURE TUBE

This invention relates generally to color picture tubes and particularly to a demagnetizing circuit for such tubes.

Color picture tubes are subjected to the effects of the Earth's and other magnetic fields, and thus periodically require demagnetization of the internal parts to avoid color impurity, and other problems. A demagnetizing coil is placed in the proximity of the tube and an initially high, but decaying, alternating current through the coil produces a magnetic field which demagnetizes the tube. Typically, it is satisfactory for the demagnetizing current to decay to a residual value of about 6 mA, because a current of this level ordinarily will not cause visible interference in the display. However, for some types of picture tubes, for example picture tubes with a 33 inch diagonal or with a 16:9 aspect ratio, it is preferable to completely turn off the demagnetizing current after the demagnetizing of the tube is completed, because it is possible for even a low demagnetizing current to cause visible interference. The interference typically consists of color purity errors which are caused by magnetic effects on the electron beams. As described in DE-OS 20 35 519, it is known to provide a relay in addition to a network including temperature-dependent resistors in the path of the demagnetizing current to completely switch off the demagnetizing current.

It is known in the art that in a television receiver having a switch-mode power supply the relay winding can be controlled from the secondary side of the power supply using a time constant module. With this technique, the switching contacts of the relay are located on the so-called hot, or primary, side of the switch-mode power supply which is connected to the input voltage network. However, the coil of the relay is on the so-called cold, or secondary, side of the switch mode power supply. The switching contacts of the relay, therefore, must be capable of conducting high currents and an expensive heavy duty relay must be used. Controlling the relay from the primary side of the switch mode power supply is possible in principle. However, a supplementary primary winding and an active circuit with a time constant module for controlling the relay winding are required for such operation. For these reasons, there is a need for a demagnetizing circuit operable with a standard type of relay which need not be capable of conducting high current. The present invention fulfills this need.

With the invention, the coil of the relay which turns the demagnetization current on and off is arranged in series with the primary of a transformer within the switch-mode power supply. The relay coil is by-passed by a negative temperature coefficient (NTC) resistor. Accordingly, with the invention, the relay switching contacts and the relay coil are both located on the primary side (hot side) of the switch-mode power supply. A high current relay therefore is not required, and a simple cost-effective relay can be utilized. Also, the supplementary coil on the primary side of the transformer, the active circuit and the time constant module including capacitors, which are needed for the prior art demagnetization circuits, are not required. This is so because the relay winding and the NTC resistor form a passive time switch. The current flowing through the primary winding of the power supply transformer is utilized to control the relay for the delayed switching off of the demagnetizing current.

Figure 1:
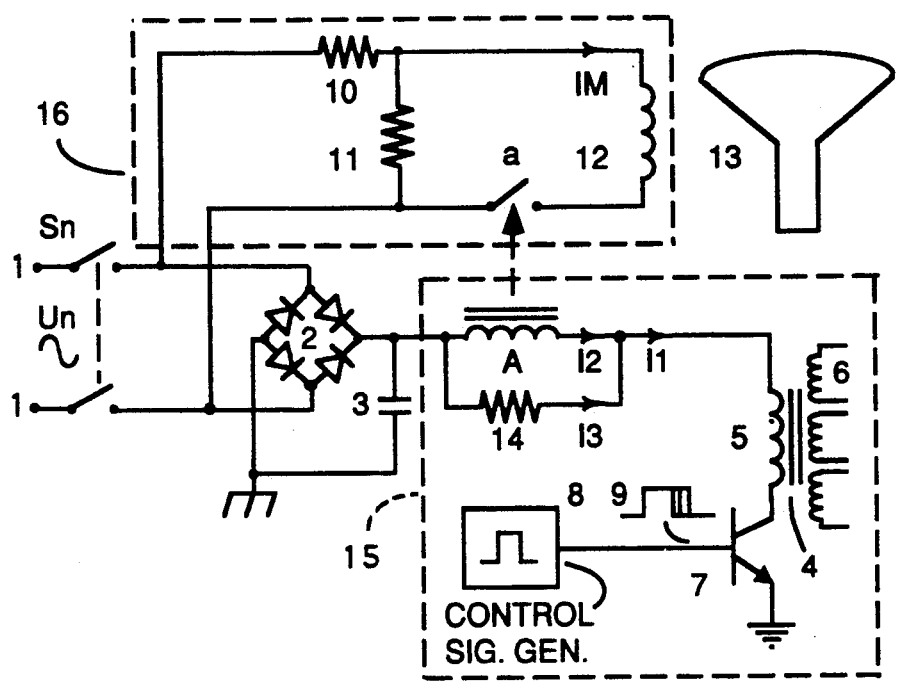
FIG. 1 is a preferred embodiment.

In FIG. 1, the power supply of a television receiver includes input terminals 1, an input switch Sn, a power rectifier 2, a charging capacitor 3 and a switch-mode power supply 15 represented in a simplified form. The switch-mode power supply 15 contains an isolating transformer 4 having a primary power winding 5 and several secondary windings 6. The high voltage side of primary winding 5 is connected to the power rectifier terminal b via the parallel combination of relay coil A and negative temperature coefficient resistor 14. The other end of winding 5 is connected to the collector of switching transistor 7 which periodically grounds the winding. The secondary windings are coupled to rectifiers and filter capacitors, not shown, to develop various voltages proportional to the turns ratio of the windings 5 and 6. A switching transistor 7 serves as a circuit breaker for the primary of the transformer 4. A control signal generator 8 provides the switching transistor 7 with a pulse width modulated voltage 9 to control and stabilize the operating voltages on the secondary side of the transformer 4.

The output side of the input switch Sn is connected to a temperature-dependent degaussing network 16, which includes a coil 12 for demagnetizing the picture tube 13. The network 16 includes a positive temperature coefficient (PTC) resistance 10 and a negative temperature coefficient (NTC) resistance 11. The switching contact 'a' of the relay is arranged in the degaussing network 16 through which the demagnetizing current $I_M$ flows.

Figure 2:
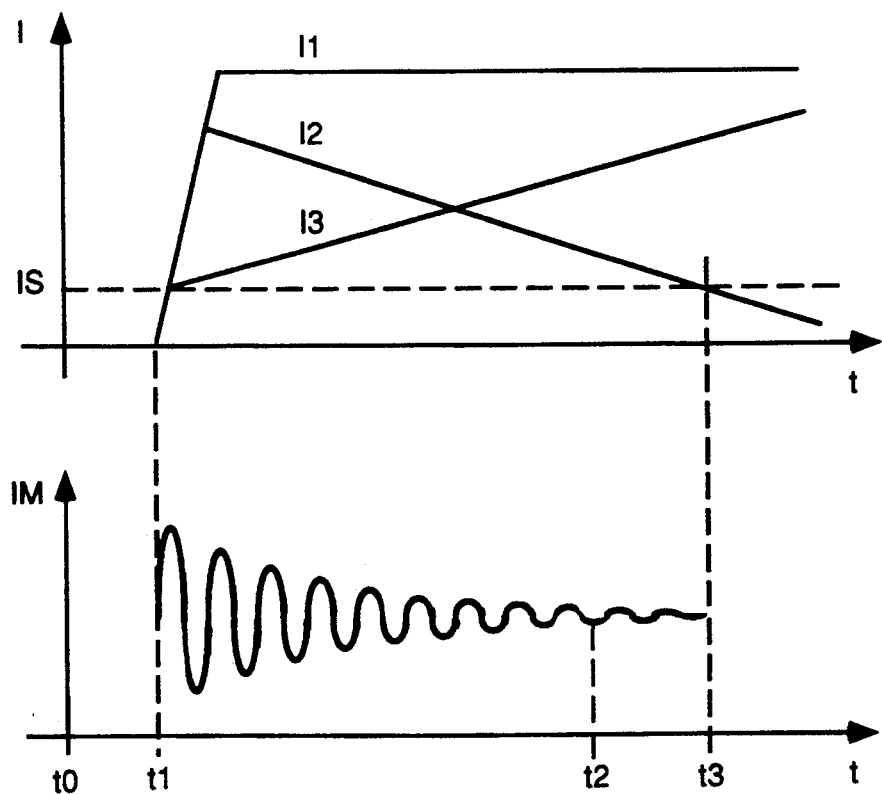
FIG. 2 shows curves illustrating the operation of the preferred embodiment of FIG. 1.

The operation of the circuit shown in FIG. 1 can be understood by referring to the waveforms of FIG. 2. At time $T_0$ the input switch Sn is open, the television receiver is off and the circuit shown in FIG. 1 is unactivated. At time $T_1$ the television receiver is turned on by closing the input switch Sn. The alternating demagnetizing current $I_M$, having an initial amplitude of about 12 amps peak-to-peak, flows through the demagnetizing coil 12, as soon as the relay contact 'a' closes. The amplitude of the current $I_M$ slowly decays as the temperature responsive resistors 10 and 11 warm up. Also, upon the closing of input switch Sn a current $I_1$, having a fairly constant amplitude, flows through the primary winding 5 of the transformer 4. The current flow through the relay coil A closes the relay contact 'a' and the demagnetizing current $I_M$ flows through the demagnetizing coil 12 and demagnetizes the tube 13. The NTC resistor 14 is separate and apart from degaussing network 16, as shown in FIG. 1. Initially NTC resistor 14 has a high resistance and the current $I_3$ through the NTC resistor 14 is low. The current $I_2$ through the relay coil A is therefore high and the relay coil A pulls the contact 'a' closed and the demagnetizing current $I_M$ flows through the demagnetizing coil 12. The current flow through the NTC resistor 14 warms up the resistor and its resistance value diminishes and more current is shunted around relay coil A. The current $I_3$, through the NTC resistor 14, therefore, increases and the current $I_1$ through the relay coil A decreases correspondingly. The current $I_1$ through the primary 5 is equal to $I_2 + I_3$ and stays fairly constant because currents $I_2$ and $I_3$, respectively, increase and decrease at approximately the same rate. At time $T_2$ the demagnetizing current $I_M$ has attained a residual value of approximately 6 mA, as predetermined by the network including resistors 10 and 11. Consequently, subsequent to time $T_2$, a small, constant demagnetizing current $I_m$ would flow through demagnetizing coil 12. This current, however, could be unacceptably large and could cause visible degrading affects in the picture displayed on the picture tube 13. At time $T_3$ the current $I_3$ has increased sufficiently to cause the current $I_2$ to fall below the holding current of the relay coil A and the contact 'a' opens. Accordingly, the demagnetizing current $I_M$ ceases to flow and any unacceptable visible affects on the screen of the picture tube 13 are eliminated.

The parallel combination of the relay coil A, and the shunting NTC resistor 14, can also be located at other positions relative to the transformer primary 5. For example, the combination can be arranged between the transformer primary 5 and the collector of the transistor 7, or between the emitter of the transistor 7 and ground.

I claim:

1. In a demagnetizing circuit having a degaussing network and a switch-mode power supply, said degaussing network including a degaussing coil and means for generating a decaying current therein and a switching contact of a switching relay, and said switch-mode power supply including the coil of said relay and the primary of a switch-mode transformer, an improvement comprising:

a parallel combination of said relay coil and a negative temperature coefficient resistor, said resistor being separate and apart from said degaussing network, said combination being in series with said primary of said switch-mode transformer, wherein at switch-on, said switch-mode power supply draws a primary winding current via said transformer primary, said primary winding current having a first component supplied via said relay coil and a second component supplied via said negative temperature coefficient resistor, said first component causing said relay to close said switching contact for initiating the generation of said decaying current in said degaussing coil, said negative temperature coefficient resistor causing said second component to increase from switch-on causing said first component to decrease to a point where said relay is released, thereby opening said switching contact and disconnecting said decaying current at a time when degaussing is substantially complete.

2. The improvement of claim 1, wherein said decaying current generating means includes a second negative temperature coefficient resistor in shunt with said degaussing coil.

3. The improvement of claim 1, wherein an AC power source is coupled to said degaussing network and to a DC voltage generating means, said DC voltage being applied to said parallel combination to generate said primary winding current.

* * * * *